350-373
SR
XR 3,465,311 29D
X 4041C
(9)
CROSS REFERENCE

INVENTORS
Bruce I. Bertelsen
Herbert J. Kump
Paul T. Chang
BY Littlepage & Quaintance
ATTORNEYS

3465311
OR IN 365/158

INVENTORS
Bruce I. Bertelsen
Herbert J. Kump
Paul T. Chang
BY Littlepage & Quaintance
ATTORNEYS

THERMOSTRICTIVE RECORDING

Filed Nov. 19, 1965 3 Sheets-Sheet 3

INVENTORS
*Bruce I. Bertelsen*
*Herbert J. Kump*
*Paul T. Chang*
BY Littlepage & Quaintance
ATTORNEYS United States Patent Office 3,465,311
Patented Sept. 2, 1969

3,465,311
THERMOSTRICTIVE RECORDING

Bruce I. Bertelsen and Herbert J. Kump, Poughkeepsie, and Paul T. Chang, Syracuse, N.Y., assignors to International Business Machines Corporation, Armonk, N.Y., a corporation of New York Filed Nov. 19, 1965, Ser. No. 508,680
Int. Cl. G11b *5/00*; G02f *1/22*
U.S. Cl. 340—174 20 Claims

ABSTRACT OF THE DISCLOSURE

A system of recording by switching the direction of magnetization at selected points in a film of anisotropic, magnetostrictive material by combining stress at a point with a magnetic field which tends to rotate the direction of the magnetization. The stress at a point may be produced by impingement of a beam of energy at a point to raise the temperature above the ambient temperature of the material and develop a temperature gradient at the point of impingement.

This invention relates to a method of and apparatus for magnetic recording and resides in recording by selectively varying the direction of magnetization over an area containing anisotropic, magnetostrictive material by the combined effect of a magnetizing field and mechanical stress. This system is herein referred to as "Thermostrictive Recording."

Recording is used in this application in its most general sense: the physical alteration of a medium to represent information, whether language, images, binary data, or other form. One type of recording is visible, in which a surface is visibly marked by printing or by light. The other most common type is magnetic, in which the magnetization of either discrete elements or a magnetic surface is varied to represent phenomena.

Optical methods of visible recording can operate at high speed and concentrate much information in a small area. Serious disadvantages are dependency on light conditions, the necessity for special processing and the inability to alter the record.

Magnetic recording is used for records which must be altered, as in a computer memory, and has the advantage of being independent of light and processing. The magnetic core memory now used in computer systems provides speed and accessibility and can be readily changed, but is expensive and requires an array of separate elements or cores with extensive circuitry. Magnetic tape, while simple and cheap, is limited in concentration of information and accessibility by the speed and scanning needed for reading.

Recently magnetic film has attracted much attention as a recording medium. Especially in the development of memory systems for computers, the recording of magnetized bits or dots on thin film presents advantages in speed and density over the magnetic core system, with substantially less cost for the film. The disadvantages of magnetic film for recording are the expense of the circuitry required, and the limitation of storage capacity.

According to the present invention, the direction of magnetization in anisotropic, magnetostrictive material is changed in each of the selected recording regions by the combined effect of a magnetizing field and a mechanical stress applied selectively in each region. The magnetizing field supplies a fraction of the energy required to switch the magnetization in the region out of an easy axis direction, so that the magnetization under the effect of the magnetizing field only requires the remaining fraction of the switching energy to switch into a direction along an easy axis. This additional energy is supplied by the mechanical stress exerted in the selected regions to rotate the anisotropy and easy axes so that the magnetization is directed along an easy axis and assumes the easy axis direction when the stress is removed.

The invention, in the particular embodiment disclosed as an example, utilizes a layer comprising anisotropic, magnetostrictive material which may be in the form of either continuous film or discrete elements. This material has an easy axis parallel to the surface of the layer, and a remanent magnetization in one direction along an easy axis. The coercivity of the material is substantially constant in the range of temperature of the material during recording, so that the recording operation is not affected by variations in temperature of the material.

To record in selected regions, a magnetizing field is applied parallel to the surface of the layer to supply a fraction of the switching energy and an energy beam is directed to each selected area to produce the stress and supply the additional energy required to switch the magnetization to an easy axis direction. This beam, shown in the form of a laser or an electron beam for example, causes a sharp temperature rise at the site where it impinges in the recording region, resulting in a maximum temperature at the site and a temperature gradient or differential in the region before the heat can diffuse through the region, so as to produce mechanical stress in the region. This stress rotates the anisotropy in the region and in conjunction with the magnetizing field switches the magnetization into a direction along the easy axis. The temperature rise which causes the gradient is extremely fast, the beam may move to successive regions very rapidly.

It is the general object of this invention to represent information by selectively varying the direction of magnetization in material having magnetizable regions of anisotropic, magnetostrictive material by applying in conjunction with the energy of a magnetizing field, the energy of mechanical stress to switch the direction of magnetization in selected regions of the magnetostrictive material.

It is a further object of this invention to alter the direction of magnetization in a region of an anisotropic, magnetostrictive material by applying the energy of a magnetizing field in conjunction with the energy of stress produced in the region by a temperature gradient caused by a rise in temperature to a maximum at a spot within the region.

It is a further object of this invention to alter the direction of magnetization in a region of an anisotropic, magnetostrictive material by applying the energy of magnetizing field in conjunction with the energy of stress produced by a beam of energy impinging on a spot within said region.

It is a more particular object of this invention to alter the magnetization of an area of an anisotropic, magnetic film having substantial magnetostriction by the conjunctive effect of magnetic energy applied to the film and mechanical energy in the form of stress concentrated in localized regions to switch selectively the direction of magnetization within the film, so that the direction of magnetization within the film varies over the area and is limited in continuity substantially by the dimensions of the switched regions. The variations in the magnetization may correspond to any contrasting surface variations and may represent any information which can be represented by such surface variations.

It is a further particular object of this invention to record information by switching the direction of magnetization in localized region or spot of the recording area of an anisotropic, magnetic film having substantial magnetostriction by the application of a magnetic field to said region to supply a fraction of the energy required to switch the direction of the magnetization within the region, the magnetic field not being of a magnitude and direction to switch the magnetization into the desired direction, and to complete the switching of the direction of magnetization by the application of stress to the film within the region to rotate the anisotropy and supply the additional energy to switch the magnetization into an easy direction. The stress may be applied by increasing the temperature within the region to create a temperature differential in the region relative to the ambient temperature of the film, a process herein called "Thermostriction."

It is also an object of this invention to record in regions of anisotropic, magnetic film having a substantial magnetostriction by the application of a magnetizing field to supply one fraction of the switching energy but not of a magnitude and direction to switch the direction of magnetization into the desired direction, and a beam of energy concentrated in the recording region to create stress in the region and to rotate the anisotropy in the region and supply the additional fraction of energy to switch the magnetization within the region by rotation. The beam, whether composed of radiation or particles, may move intermittently or continuously to change selectively the direction of magnetization within the film, the continuity of the recording being limited by the dimensions of the switched regions, so that the variations in magnetization over the film represent information in the form of an image, binary data or other phenomena capable of representation by contrasting variations of a surface. Specifically the beam may create stress in the region by increasing the temperature to produce a temperature differential relative to the ambient temperature of the film, this action in the magnetostrictive film being herein called thermostriction.

Other objects of this invention will be pointed out in the following description and claims and illustrated in the accompanying drawings, which disclose, by way of example, the principle of the invention and the best mode, which has been contemplated, of applying that principle.

The foregoing and other objects, features and advantages of the invention will be apparent from the following more particular description of preferred embodiments of the invention, as illustrated in the accompanying drawings.

To understand this invention, the action of magnetization in a magnetic film must first be understood, especially in a thin film of 1000 A. or less in thickness. Reference is made to the book by M. Prutton, "Thin Ferromagnetic Films," published by Butterworths, Washington, D.C., 1964, which has much of the latest published work in this field. The film may be deposited on a substrate in a magnetic field, so that the film has a magnetization directed along an axis parallel to the surface: the easy axis. Such a film is known as anisotropic, and may have plural axes of magnetization, but usually it is uniaxial, having a single easy axis.

The magnetization in an anisotropic thin film may be directed in either direction along an easy axis; in a uniaxial film one direction may be used to represent binary zero, or negative or black; the other direction may represent "one," or positive or white. By switching the direction of magnetization in a discrete element or in a small region of a film, recording takes place to change selectively from zero to one, from negative to positive, or black to white in each recording region.

Figure 1:
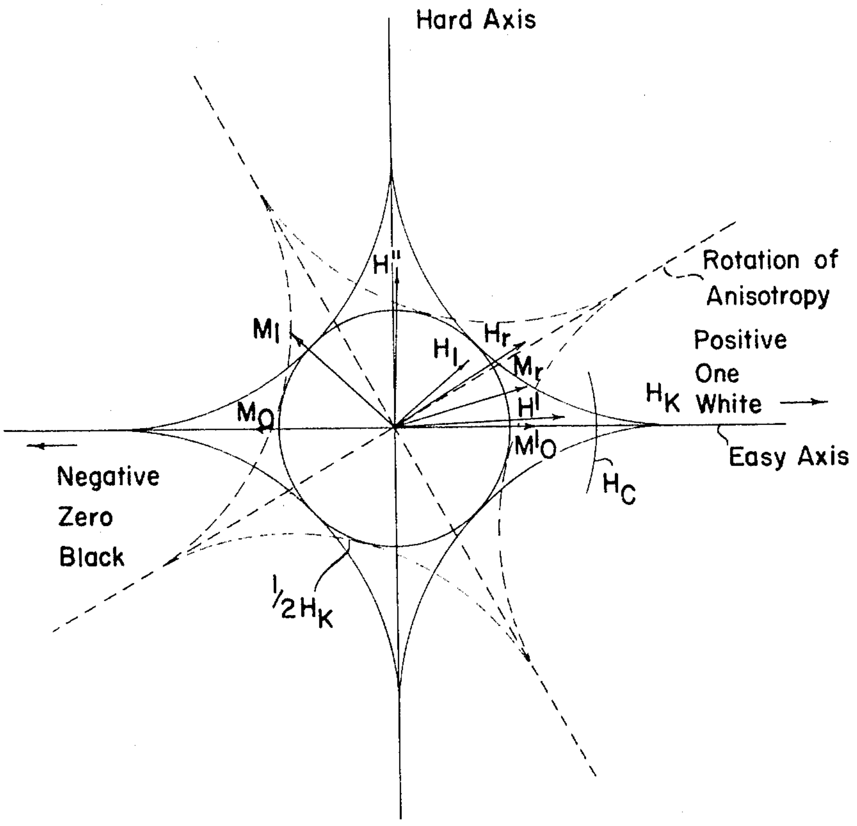
FIGURE 1 is a diagram of the curves and forces acting in the magnetization of a ferromagnetic film used in this method.

The magnetizing forces in an ideal, thin, uniaxial, anisotropic film are illustrated by the curve shown in FIGURE 1. The magnetizing force necessary when directed along the hard axis at 90° to the easy axis to rotate the magnetization into that direction is denoted by $H_k$ and is by definition the anisotropy field. Thus, to switch rotationally the magnetization from the negative easy direction to the positive easy direction requires a magnetizing field having a magnitude exceeding $H_k$ when directed in the positive easy direction. That is, the switching energy must exceed the anisotropy energy, the energy required to rotate the magnetization from an easy direction into the hard direction.

The hypocycloid curve or astroid of FIGURE 1 represents the switching threshold for the film. S. Middlehoek gives an explanation of the switching processes in thin films in IBM Journal of Research and Development, vol. 6, No. 4, October 1962, at p. 394, under the title, "Static Reversal Processes in Thin Ni-Fe Films." If the vector of magnitude and direction of a magnetizing field lies within the curve (as at $H_l$), the magnetization in the film will be a resultant vector $M_l$, and the magnetization will return to its original direction ($M_o$) on removal of the magnetizing field.

Let the magnetizing field $H_r$ be of such magnitude and direction that its vector extends beyond the curve, and the magnetization will be switched into a positive direction, as shown by $M_r$; it will assume the direction $M_o'$ on removal of the field.

Switching the direction of magnetization may involve not only rotation of the magnetization by rotating the dipoles within the domains, but may also produce movement of the "walls" separating the domains. These walls move very slowly when compared with the speed of coherent rotational switching. They are actually bands or corridors of magnetization constituting a transition between the magnetization of the domains, the magnetization of the walls differing in direction from that of the domains. When the wall motion threshold, curve $H_c$, is exceeded these walls may be caused to "move," or rearrange themselves to adapt to the changes in the magnetization of the domains, a process requiring a much higher order of time than the coherent rotation of the dipoles. For this reason, switching by coherent rotation of the dipoles is far faster than switching by magnetizing fields which produce wall motion.

Referring to the curve in FIGURE 1, the magnetizing field vector H′ lies within the switching threshold and cannot rotate the magnetization $M_o$ into the new easy direction. But if the direction of the vector relative to the curve were changed by rotation of the magnetizing field, the vector would extend beyond the switching threshold (as at $H_r$) and the magnetization of the film would be rotated. The same effect can be produced by rotating the anisotropy (see the dotted curve), so that the axes are rotated instead of the vector, and the vector of the magnetizing field will extend beyond the switching threshold. The vector of the magnetizing field then extends beyond the switching threshold and the magnetization will assume the opposite easy direction. In this way, rotation of the anisotropy lessens the energy required of the magnetizing field, and may be said to supply the added energy needed for switching the magnetization.

The anisotropy and axes may be rotated in a magnetostrictive film by exerting a stress on the film. This phenomenon is described in a paper by E. N. Mitchell, G. I. Lykken and G. D. Babcock, Compositional and Angular Dependence of the Magnetostriction of Thin Iron-Nickel Films," Journal of Applied Physics, vol. 34, No. 4, April 1963, pp. 715–722. The film must have a magnetostriction of $10^{-6}$ or greater, either positive or negative. In a Ni-Fe film, for example, a composition of 80.5 percent to 81 percent Ni will be inoperative as having substantially zero magnetostriction, and in practical operation, the range within 78 percent to 83 percent Ni and 22 percent to 17 percent Fe is to be avoided. When a magnetic field of less than $H_k$ but greater than the minimum switching threshold ½ $H_k$ is applied to such a magnetostrictive film, and the anisotropy is rotated by exerting a stress on the film, the magnetization may be switched from one easy axis direction to another, or from negative or positive. The stress supplies the energy needed to be added to the magnetizing energy to complete the switching process.

The stress exerted on the film may be derived from any available source, and in this invention, for reasons which will become apparent from the explanation of the method, thermal energy in the form of a thermal differential in the film is used to develop the stress. If, in the selected recording region, the temperature is increased or decreased relative to the ambient temperature of the film in the surrounding area, a temperature differential will be produced which will create a stress in the selected region, and so rotate the anisotropy. A beam of energy, such as an electron beam or a laser beam, directed at the region will supply the energy to produce the temperature differential and create a stress in the region, so as to rotate the anisotropy in the region. If an electron beam is used, it should be of sufficiently low energy that the response of the film will be due to thermal interaction rather than to a magnetic field interaction. The beam increases the temperature at the site of impingement only enough to produce the temperature differential in the region.

This invention consists in the conjunctive effect of the magnetizing field and the rotation of the anisotropy by the stress produced in a magnetostrictive film to switch the magnetization out of and into an easy direction. The magnetizing field does not have the magnitude and direction to switch the magnetization into the direction of an easy axis but furnishes a fraction of the switching energy and the stress exerted on the film provides the necessary additional energy. As has been described, when a magnetizing field H′ is applied to the recording region in an anisotropic, magnetostrictive film, the field having a magnitude exceeding the minimum switching threshold ½ $H_k$, but in a direction as at H′, will not switch the magnetization into a direction along an easy axis. A temperature differential or gradient is then produced in this region, developing a stress in the region to rotate the anisotropy so that the magnetizing field vector extends outside the threshold switching curve, resulting in the magnetization assuming a direction along the easy axis.

The magnetizing field may be of such magnitude and direction that its vector will extend beyond the curve of the astroid when rotated, in which case the magnetization will rotate to the new easy axis direction when the axis is rotated and the field is removed. In FIGURE 1, the vector H″ represents a magnetizing field in the general direction of the hard axis, but within the curve. As shown in this figure, the magnetizing field extends outside of the threshold curve on rotation of the easy axis by the stress exerted on the film and the resulting magnetization assumes a positive direction along the easy axis after removal of the field.

Figure 2:
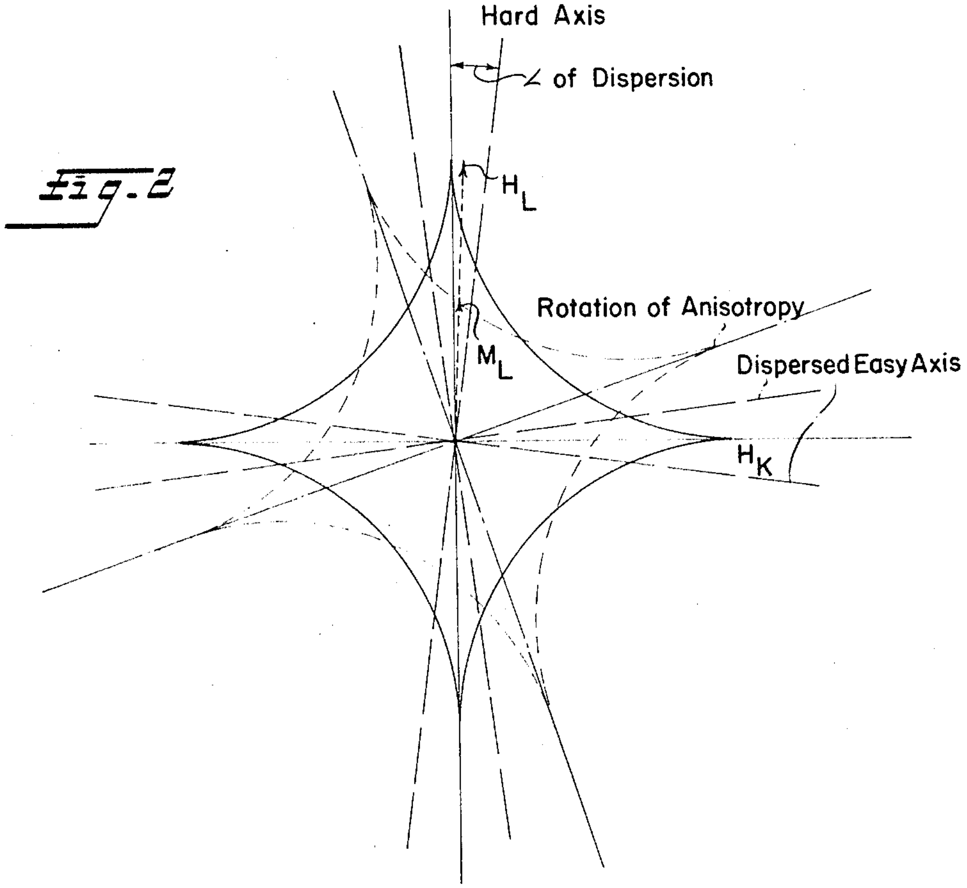
FIGURE 2 is a diagram similar to FIGURE 1, illustrating a modified operation.

It is also possible to apply the same principle to the dispersion locked operation described in application Ser. No. 334,858 of Bertelsen et al., filed Dec. 31, 1963. In most films, the angular dispersion of the easy axis is held to a minimum, and such low dispersion films may be used in the above-described operation. It is possible, however, as shown in FIGURE 2, to use a film of high angular dispersion, on the order of 8° or greater, to apply a saturating magnetizing field $H_L$ along the hard axis and establish a remanent state of magnetization in that direction. This field will not be of a magnitude and direction which will cause the magnetization to switch into a direction along an easy axis. As shown by the vector $M_L$ in FIGURE 2, the magnetization is "locked" in the hard direction due to the angular dispersion, and energy is required to rotate the magnetization out of the hard direction, as by application of a magnetizing field, and beyond the "locking angle" of the dispersed axes, so it will assume an easy direction. The same result may be accomplished by the exertion of stress on the magnetostrictive film to rotate the anisotropy. Using an electron beam or a laser beam, the temperature differential creates stress in this region, thereby rotating the anisotropy beyond the "locking angle" and unlocking the magnetization along the hard axis. This action is illustrated in FIGURE 2, where the magnetization $M_L$ is no longer locked by the dispersed axes when the axes are rotated.

In switching the magnetization from the hard direction into an easy direction, a small bias field may be applied directed along the easy axis at the same time as stress is produced in the recording region. This bias field is insufficient to unlock the magnetization in the hard direction, but insures coherent rotation of the dipoles into the same direction along the easy axis.

The making of a record requires that the recording regions, whether discrete elements or spots on a film be selectively magnetized in selected directions in the regions. In the method and apparatus used for illustration, the film selected is a thin, Permalloy film, of the order of 1000 A. or less in thickness, preferably not more than 500 A. This film has a magnetostriction value of at least $10^{-6}$ or higher and its coercivity is substantially constant within the temperature range of operation, so that variations in the ambient temperature will not affect the magnetization.

An electron beam is used in this apparatus for recording; such a beam may be concentrated in a small region, is readily controlled and operates at very high speed. The regions of film of the layer used as a record element are first placed in a "zero" or negative magnetization direction by a magnetizing field establishing a remanent state in the negative easy direction. To "write," a magnetizing field having a vector magnitude greater than ½ $H_k$, for example H′, is applied, as shown in FIGURE 1, and the electron beam is directed to the recording regions in the film area. This beam, as it impinges on a recording region, raises the temperature at the point of impact within the region sufficiently, on the order of 10° C. to 20° C. above the ambient temperature, to produce a stress in the region which rotates the anisotropy so that the magnetization rotates into the opposite or positive easy direction.

Figure 3:
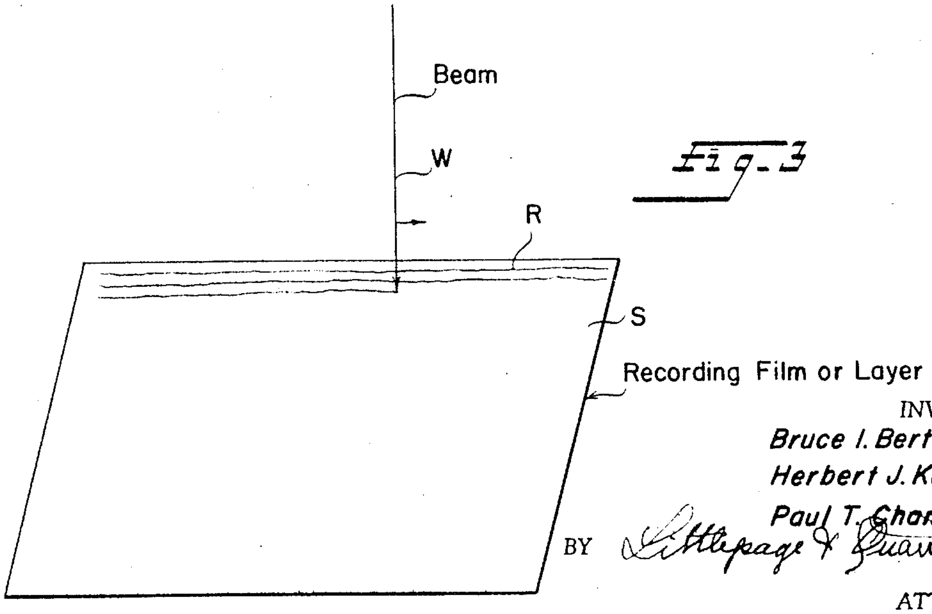
FIGURE 3 illustrates in its broadest sense the scanning of the film for "writing" magnetically by this method.

Operation of recording by a scanning beam according to this invention is illustrated diagrammatically in FIGURE 3. A sheet or layer S comprising anisotropic, magnetostrictive material is scanned by any appropriate energy beam W. The magnetic material has a remanent magnetization directed along an easy axis parallel to the surface of the layer and is subjected to a magnetizing field parallel to the surface to supply a fraction of the energy necessary to rotate the magnetization into the opposite direction along the easy axis. This magnetizing field may either bias the magnetization toward the opposite direction, as illustrated in FIGURE 1, or may establish a remanent magnetization in the hard direction in a dispersion locked film, as shown in FIGURE 2.

In either operation, the scanning beam W impinges on the film, causing a rise in temperature at the site of impingement and creating a temperature gradient in the recording region, thereby producing stress in the region, rotating the anisotropy to switch the magnetization into the easy axis direction. As this beam moves along the surface, it selectively switches those regions to record information at R in a binary form of "one," positive or white, for example, according to the information controlling the beam. As a result of this operation, a magnetic record is formed in the layer which may correspond to the dots in a black and white printed half tone surface.

The beam may be controlled to move intermittently from spot to spot, or region to region, selectively, or may move continuously to produce a trace magnetically. Variation in the energy of the beam will alter the size of the recording regions or width of the trace, to provide a highly versatile operation.

Figure 4:
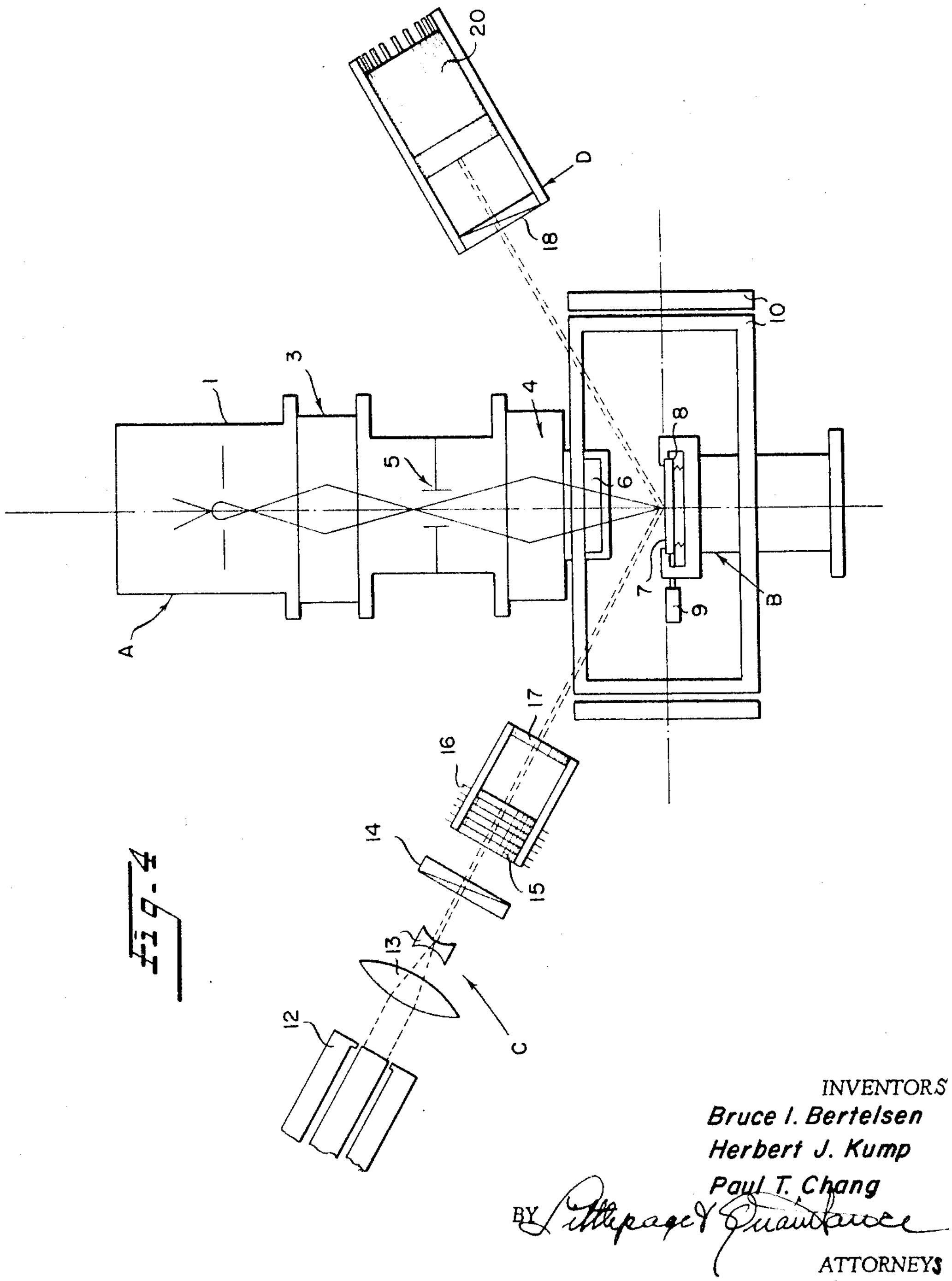
FIGURE 4 shows the apparatus used in the operation for carrying out the method.

FIGURE 4 illustrates specific apparatus for recording or writing, as well as the "reading" apparatus to be described later. An electron beam apparatus A is used to produce and control the electron beam impinging on the film mounted at B. The reading apparatus utilizing the Kerr effect includes a laser beam system C, a projection system D with an analyzer and a phototube.

In the "writing" apparatus, the electron beam apparatus includes an electron gun assembly 1, focusing lens 3 and 4, an electronic switch 5 and the deflector yoke 6. These are the conventional elements of this apparatus. The beam is directed to the film 7 mounted on the substrate 8, which may be adjusted by micrometer movement 9. Two sets of Helmholtz coils 10 provide the necessary magnetizing fields in the plane of the film.

For "reading," the laser beam system C comprises a laser 12 emitting a beam which passes through the collimating lens 13 and polarizer 14. Calcite light deflectors 15 deflect the beam as determined by deflector controls 16 and the beam is directed onto the film 7 by lens 17.

The reflected beam from film 7 passes through the analyzer 18 and impinges on photomultiplier tube 20, which develops pulses according to the changes in the polarized beam as determined by the rotation of polarization resulting from the magnetization of the spots in the film 7.

The regions in the recording area may be restored to their original or zero position by a magnetizing field in the direction of zero position. This field must exceed $H_k$, and can be directed along the easy axis in the negative or zero direction in FIGURE 1, or in the direction of the hard axis in the dispersion locked operation illustrated in FIGURE 2.

In a typical system, when the information is stored by selective magnetization of regions or spots in the film, an anisotropic, uniaxial, ferromagnetic film is used, having a thickness of 500 A. and magnetostriction of $10^{-5}$. A low energy electron beam is used which produces no magnetic field interaction and which may be focused to record on spots of the order of 8 microns in diameter. This beam will raise the temperature of the point of impact in these spots or regions 10° C. to 20° C. over the ambient temperature of the film and produce the stress required to rotate the anisotropy for recording. It has been found that with a beam voltage of 10 kv., a dwell time of approximately 30 nanoseconds is sufficient for recording in a spot. Calculations indicate that a density as high as $10^7$ dots per square inch at a speed of $10^7$ dots a second is theoretically feasible.

As described above, the ferromagnetic film should be very thin, preferably not more than 500 A. and have substantial magnetostriction. When used for 180° switching, a low angular dispersion is desirable. In the dispersion locked mode operation, special high dispersion film is used for locking the hard direction magnetization. Other magnetic materials having the properties of anisotropy and sufficient magnetostriction may also be used. A gadolinium-iron-garnet is readily switched by this method, and various alloys of cobalt, iron and nickel may also be used. It is desirable to form the film with an overlayer on the surface, such as silicon monoxide, which protects the film and improves the read-out by the Kerr effect, as described above. With film of this type, the overlayer is heated in the recording region by the impinging beam, causing stress in the overlayer. This stress is transmitted to the film and in this way the film is stressed to rotate the anisotropy.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. The method of recording on a layer of material which comprises regions of anisotropic, magnetostrictive material, each of said regions having a remanent magnetization in a direction along an easy axis parallel to the surface of said layer and having substantially constant coercivity within the range of temperature of the recording operations, comprising applying a magnetizing field to said regions parallel to said surface in a direction to supply a fraction of the energy required to switch the magnetization to a new easy direction, but not of a magnitude and direction to rotate the magnetization into a new easy direction, and producing mechanical stress selectively in selected regions to rotate the anisotropy and supply the added energy required to switch the magnetization of said selected regions into a direction along an easy axis.

2. The method defined in claim 1, and applying a magnetizing field to said regions of said material of greater magnitude than said first field directed to switch all said regions into a direction along an axis which had a remanent magnetization prior to application of said stress.

3. The method of recording by switching the direction of magnetization in a region of a film element, said element including a region of anisotropic, magnetostrictive material having an anisotropy field of magnitude $H_k$ with an easy axis of magnetization parallel to the surface of the film element, the coercivity being substantially constant throughout the range of temperature of the film element during recording, said method comprising applying a magnetizing field of greater magnitude than ½ $H_k$ to said region of said film element directed to rotate the magnetization of the film out of an easy axis direction, but not of a magnitude and direction to switch the magnetization into a new easy direction, and varying the temperature of a spot in said region of said film element relative to the surrounding area to produce a stress in said region so as to rotate the anisotropy and easy axis in said region sufficiently for the magnetization to switch into an easy axis direction.

4. The method of recording by switching the direction of magnetization in a region of a film element, said element including a region of anisotropic, magnetostrictive material having an anisotropy field of magnitude $H_k$ with an easy axis of magnetization parallel to the surface of the film element, the coercivity of said material being substantially constant throughout the range of temperature of the film during recording, said method comprising applying a magnetizing field of greater magnitude than ½ $H_k$ to said region of said film element directed to rotate the magnetization of the region out of an easy direction, but not of a magnitude and direction to switch the magnetization into a new easy direction, and directing a beam of energy to impinge on said region to raise the temperature of said region relative to the surrounding area to create a stress in said region so as to rotate the anisotropy and easy axis in said region sufficiently for the magnetization to switch into an easy axis direction.

5. The method of recording by selectively switching the direction of magnetization of regions of a film element, said element including an anisotropic, magnetic film of magnetostrictive material having an anisotropy field of magnitude $H_k$ with an easy axis of magnetization parallel to the surface of the film, said method comprising applying a magnetizing field less than the anisotropy field, $H_k$, and greater than ½ $H_k$ directed to rotate the magnetization of said film out of one easy direction, and applying stress selectively to said localized regions coincident with said magnetizing field to rotate the anisotropy in said selected regions so that said magnetizing field will switch said regions into another easy direction.

6. The method of recording by switching the direction of magnetization in a region of a film element, said element including an anisotropic, magnetic film of magnetostrictive material having hard and easy axes of magnetization parallel to the surface of the film and angular dispersion of the hard and easy axes sufficient for establishing a remanent state of magnetization along a hard axis, the coercivity being substantially constant throughout the range of temperature of the film during recording, said method comprising applying a magnetic field of sufficient magnitude directed along said hard axis to establish a remanent state of magnetization along said hard axis, and varying the temperature of said region of said film element relative to the surrounding area to produce a stress in the film in said region of said film sufficiently for the magnetization to switch into an easy direction.

7. The method of recording by varying the direction of magnetization in selected regions of anisotropic, magnetostrictive material which has remanent magnetization directed along an easy axis and substantial angular dispersion so that a remanent magnetization may be established along the hard axis, said method comprising applying a magnetizing field directed along the hard axis to establish a remanent magnetization locked in the direction of the hard axis, producing mechanical stress in said region to cause rotation of the anisotropy and the hard and easy axes to unlock said remanent magnetization along said hard axis, and applying a bias field directed at an angle to said hard axis having insufficient energy to rotate said magnetization out of said hard direction concomitantly with said stress to direct rotation of said magnetization in one direction out of said hard direction and along said easy axis.

8. The method of recording by varying the direction of magnetization in selected regions of anisotropic, magnetostrictive material which has remanent magnetization directed along an easy axis and an overlayer of material overlying said magnetostrictive material comprising applying a magnetizing field to said regions to supply a fraction of the energy required to rotate the magnetization into a new easy axis direction and producing stress in said overlay in said selected regions to exert stress on said magnetostrictive material in said selected regions to rotate the anisotropy and supply the additional energy required to switch the magnetization into an easy axis direction.

9. The method of recording information by switching the direction of magnetization in selected regions of anisotropic, magnetostrictive material in a layer of material, said regions having easy and hard axes parallel to the surface of said layer and a remanent magnetization directed along an easy axis and substantially constant coercivity in the range of temperature of the recording operation, comprising applying a magnetizing field to said regions of said layer to supply a fraction of the energy required to switch said regions into a new easy axis direction but not of a magnitude and direction to complete said switching, and scanning said regions selectively with an energy beam to impinge said beam on selected regions representing information to be recorded, said beam raising the temperature at the side of impingement in each selected region to create a temperature gradient in said region and produce a stress in said region to rotate the anisotropy and supply the additional energy required to rotate the magnetization in each selected region into an easy axis direction.

10. In a recording system, a layer of material comprising regions of anisotropic, magnetostrictive material having an easy axis parallel to the surface of the layer and a coercivity which is substantially constant throughout the range of temperature of the magnetostrictive material during recording, means to apply a magnetizing field to said regions parallel to said surface directed to rotate the magnetization but not of a magnitude and direction to switch said magnetization into a new easy axis direction, and means to direct a beam of energy onto a selected region to increase the temperature at the site of impact and create a thermal gradient in said region to produce a stress in said region and rotate the anisotropy in said region sufficiently for the magnetization to rotate into the direction of an easy axis.

11. In a recording system, a layer of material comprising regions of anisotropic, magnetostrictive material having an easy axis parallel to the surface of the layer and a coercivity which is substantially constant throughout the range of temperature of the magnetostrictive material during recording, means to apply a magnetizing field to said regions parallel to said surface directed to rotate the magnetization and to supply a fraction of the energy required to switch the magnetization into a new easy axis direction, and means to supply additional energy to switch the magnetization of a region into an easy axis direction comprising an energy source directing energy to said region to exert a stress in the material in said region and rotate the anisotropy in said region sufficiently for the magnetization to rotate into the direction of an easy axis.

12. In combination with a magnetic element comprising an anisotropic, magnetic film having substantial magnetostriction and having an easy axis of magnetization parallel to the surface of the film and a coercivity which is substantially constant throughout the temperature range of the film during recording, means to apply a magnetizing field to said film to switch the direction of magnetization but not of a magnitude and direction to switch the magnetization into the direction of a new easy axis, and means to exert a stress selectively on said film in selected regions to rotate the anisotropy of the film in those regions and cause the magnetization in the selected regions to switch into an easy direction.

13. A system for representing information by contrasting magnetization of the regions in a layer, said system comprising a layer of material which comprises regions of anisotropic, magnetostrictive material having hard and easy axes parallel to the surface of the layer and having substantially constant coercivity throughout the temperature range of the material during recording, means to establish a remanent state of magnetization in a direction along one of said axes in said regions, and means to switch selected regions of said area from a direction along said one of said axes into another direction along an easy axis including means exerting stress on said selected regions to rotate the anistropy in said regions.

14. A system for representing information by contrasting variations in magnetization of the regions in a magnetic film so that the variations in the magnetization may represent information capable of representation by contrasting variations on a surface, comprising in combination, a film having regions of anisotropic, magnetic material which have an easy direction of magnetization parallel to the surface of the film and substantial magnetostriction, said material having substantially constant coercivity throughout the temperature range of the material during recording, means to apply a magnetizing field to said film to establish a remanent state of magnetization in all said regions in one direction along an easy axis, means to apply a second magnetizing field to said film to switch said magnetization out of said easy direction but not of a magnitude and direction to switch the magnetization into a new easy direction, and scanning means for concentrating energy in said film at the site of impingement and movable across said film to produce stress in said material in successive, selected regions so that the stress rotates the anistropy of said selected regions and causes the magnetization to switch into an easy direction in said electrical regions.

15. A system for switching selectively the direction of magnetization in selected regions of anisotropic, ferromagnetic film which has substantial magnetostriction and substantially constant coercivity within the temperature range of the recording operation, so that the variations in the magnetization may represent information or data which may correspond to presentation by contrasting variations on a surface, said system comprising means to apply a magnetizing field to said regions to establish a remanent state of magnetization in the regions in one direction along an easy axis, means to apply a second magnetizing field to said regions to provide a fraction of the energy required to rotate said magnetization out of said easy direction and to switch the magnetization into a remanent state in a new easy direction, and scanning means for concentrating energy in said regions at the site of impingement and movable over said regions for selectively creating stress in successive regions so that the stress rotates the anisotropy of said selected regions and supplies the additional energy required to cause the magnetization to switch into an easy direction in said selected regions.

16. In a recording system, a layer of material comprising regions of anisotropic, magnetostrictive material having hard and easy axes parallel to the surface of the layer and having a coercivity which is substantially constant throughout the range of temperature of the magnetostrictive material during recording, means to apply a magnetizing field to said regions to establish a remanent state of magnetization along one of said axes, means comprising a beam of energy to impinge on selected regions to increase the temperature of the material at the site of impingement and create a temperature gradient in said region to produce stress and rotate the anisotropy, and means to apply a second magnetizing field of less magnitude than said first field and directed to rotate the magnetization in said region into an easy direction during application of said stress.

17. The method of changing the direction of magnetization at a point in an anisotropic, magnetostrictive material comprising applying energy at said point to raise the temperature at said point above the ambient temperature of the surrounding material to develop a temperature gradient at that point, the coercivity of said material being substantially constant within the range of temperature encountered, said temperature gradient establishing a stress in said material which causes rotation of the direction of magnetization at that point.

18. The method as claimed in claim 17, in which a beam of radiation energy is directed to said point to produce the rise in temperature at said point.

19. In a system for controlling the direction of magnetization at a selected point in an anisotropic, magnetostrictive material, said material having at least one easy axis of preferred magnetization, and having substantially uniform coercivity within a certain range of temperature, comprising means applying energy to raise the temperature of the material at said selected point above the ambient temperature of said material and within said range of uniform coercivity, to develop a temperature gradient at said point and produce a stress to change the direction of magnetization at said point.

20. In the system for changing the direction of magnetization as claimed in claim 19, in which means is provided to direct a beam of energy at said selected point to increase the temperature at said point.

References Cited

Electro-Technology, "Ferromagnetic Domains," by Lt. Philip I. Hershberg, January 1962, pp. 74–77.

BERNARD KONICK, Primary Examiner

S. POKOTILOW, Assistant Examiner

U.S. Cl. X.R.

250—219; 340—174.1; 346—74; 350—151